United States Patent [19]

Valyi

[11] 4,149,645
[45] Apr. 17, 1979

[54] PLASTIC ARTICLE AND METHOD FOR MAKING SAME

[76] Inventor: Emery I. Valyi, 5200 Sycamore Ave., Riverdale, N.Y. 10471

[21] Appl. No.: 860,708

[22] Filed: Dec. 15, 1977

Related U.S. Application Data

[60] Continuation-in-part of Ser. No. 592,551, Jul. 2, 1975, which is a division of Ser. No. 186,984, Oct. 6, 1971, Pat. No. 3,787,157, which is a continuation-in-part of Ser. No. 100,050, Dec. 21, 1970, Pat. No. 3,719,735, and Ser. No. 71,734, Sep. 14, 1970, Pat. No. 3,717,544.

[51] Int. Cl.² ........................................... B65D 23/00
[52] U.S. Cl. ................................................ 215/1 C
[58] Field of Search ............... 264/97; 206/459, 524.2; 215/1 C, 12, 100; 220/3, 83, 453

[56] References Cited

U.S. PATENT DOCUMENTS

| | | | |
|---|---|---|---|
| 3,108,850 | 10/1963 | Brandt | 264/97 |
| 3,457,337 | 7/1969 | Turner | 215/12 R |
| 3,557,827 | 1/1971 | Marsh | 220/3 |
| 3,592,885 | 7/1971 | Goins | 215/1 C |
| 3,837,517 | 9/1974 | Held, Sr. | 215/1 C |

FOREIGN PATENT DOCUMENTS

| | | | |
|---|---|---|---|
| 29980 | 8/1971 | Japan | 264/97 |
| 195726 | 4/1965 | Sweden | 264/97 |

Primary Examiner—Ro E. Hart
Attorney, Agent, or Firm—Bachman and LaPointe

[57] ABSTRACT

Multilayered, hollow plastic articles and method for making same are disclosed. The articles have a base portion, integral side walls and an integral open neck or rim portion. The articles also have an inner first layer of thermoplastic material and an outer second layer of pressure molded, thermoplastic material, wherein the inner layer includes a heat absorbing and/or dissipating base portion.

6 Claims, 6 Drawing Figures

PLASTIC ARTICLE AND METHOD FOR MAKING SAME

CROSS REFERENCE TO RELATED APPLICATION

This application is a continuation-in-part of copending application Ser. No. 592,551, filed July 2, 1975, which in turn is a division of application Ser. No. 186,984, filed Oct. 6, 1971, now U.S. Pat. No. 3,787,157, which in turn is a continuation-in-part of application Ser. No. 100,050, filed Dec. 21, 1970, now U.S. Pat. No. 3,719,735 and application Ser. No. 71,734, filed Sept. 14, 1970, now U.S. Pat. No. 3,717,544.

BACKGROUND OF THE INVENTION

This invention relates to multilayered plastic articles, such as containers, that are provided with a liner or inner layer having different properties than the remainder of the article. Such lined articles are desirable whenever it is difficult to satisfy all of the requirements and specifications by using a single plastic. For example, my previous U.S. Pat. Nos. 3,717,544, 3,719,735 and 3,787,157 disclose multilayered plastic articles and the preparation of same characterized by placing a relatively thin sleeve of plastic over a blow core with the sleeve corresponding to the shape of the blow core, molding organic plastic material thereover in a parison mold to form a composite parison, and expanding the composite parison in a blow mold to form a multilayered hollow plastic article.

The procedure for preparing articles of the foregoing type involves pressure molding molten plastic in a mold around a pre-formed plastic liner on a core. In view of the high temperature of the molten plastic, in some instances localized melting of the liner will occur at the gate, i.e., the point of entry of the plastic into the mold, which may damage the liner and result in an unacceptable final product.

Accordingly, it is an object of the present invention to provide an improved multilayered hollow article and method of obtaining same.

It is a further object of the present invention to provide an improved process for making multilayered hollow plastic articles using a pre-formed plastic liner, which process enables the formation of the multilayered articles without excessive heat damage to the liner.

It is a still further object of the present invention to provide an improved, pre-formed liner for use in a process as aforesaid.

Further objects and advantages of the present invention will appear hereinafter.

SUMMARY OF THE INVENTION

In accordance with the present invention it has now been found that the foregoing objects and advantages may be readily obtained. The multilayered hollow plastic article of the present invention has a base portion, integral side walls, and an integral open neck or rim portion. The article has an inner first layer of thermoplastic material and an outer second layer of pressure molded, thermoplastic material, wherein the inner layer includes a heat absorbing and/or dissipating base portion which may be a separate member adhered to the base of the first layer. The heat absorbing or dissipating portion may be virtually any material which is resistant to the temperatures of injection of the molten plastic of the outer layer, e.g., where the outer layer is polypropylene the injection temperature is about 220° C. For example, suitable heat dissipating members include, but are not limited to, aluminum or aluminum alloys, polycarbonates, polyesters, nylon, teflon, etc.

The heat dissipating member may be a plaque or the like integral with or adhered to the base of the liner which acts to absorb or to dissipate the heat of the injected plastic outer layer. The resultant composite articles may then be expanded, if desired, in a conventional blow mold to form a hollow plastic article or container exhibiting the characteristics of blow orientation. The heat absorbing or dissipating portion does not interfere with the expansion since the base portion of the composite containing said portion does not expand substantially in the expansion process.

Thus the method of the present invention relates to a method of making multilayered, hollow plastic articles on a core in a mold by pressure molding molten plastic from a gate around a pre-formed plastic liner on said core, wherein the improvement of the present invention comprises providing said liner with a hear absorbing and/or dissipating portion adjacent the gate to act as a shield and absorb or dissipate the heat of said molten plastic. In addition to the foregoing, the present invention resides in an improved hollow, thermoplastic article having a base portion, integral side walls and an integral open neck or rim, said article including a heat absorbing or dissipating thickened base portion.

It can be readily seen that the present invention eliminates the problem of localized melting of the liner at the injection area and, therefore, prevents the damage that may otherwise occur. This significant advantage is achieved without sacrificing the inherent advantages of this composite article. Indeed, an improved article is obtained in accordance with the present invention by virtue of the strengthening of the base portion, i.e., strengthening is achieved at a key area. Also, the process of formation of this article is not impaired.

BRIEF DESCRIPTION OF DRAWINGS

The nature of the present invention will be better understood from the following description taken in conjunction with the accompanying drawings in which specific embodiments have been shown for the purposes of illustration.

In the drawings.

DETAILED DESCRIPTION

Figure 1:
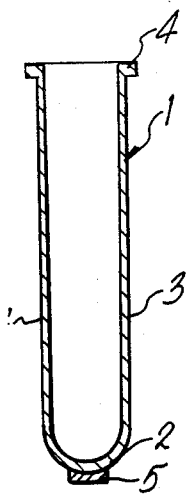
FIG. 1 is a longitudinal section of a pre-formed plastic liner of the present invention adapted to surround a core, as a blow core.

Referring to the drawings in more detail, FIG. 1 shows a pre-formed plastic liner 1 of the present invention for the core, which may be a blow core, to be used in the subsequent molding operation, having an inner surface closely approximating the outer surface of the core. The liner has a closed, thickened heat absorbing or dissipating base portion 2, integral sidewalls 3 extending upward therefrom and terminating at the upper end in an open neck or rim 4. The rim or neck 4 may conform to the top region of the hollow article to be made. Article 1 includes a heat absorbing or dissipating thickened base portion 2 which acts as a shield in a manner which will be described in more detail hereinbelow. The thickened base portion 2 may include a heat absorbing or dissipating member 5 adhered to the base of article 1 by any desired means, as by gluing or heat sealing, to provide a firm connection between the liner 1 and member 5. Alternatively, one may simply enlarged the base in order to provide a substantially thickened base portion 2 which will act as a heat absorbing or dissipating member.

One may utilize a separate member 5 which is a disc or plaque adhered to the base 2 of article 1 as described above. Member 5 may be any material having resistance to the temperature of the molten plastic to be injected around the liner, such as aluminum or aluminum alloys, polycarbonates, polyesters, nylon, teflon and the like, dependent on the temperature of the injected plastic.

The liners may be produced from a variety of plastics at a reasonable cost by methods well known in the art, such as, for example, by thermoforming, injection molding, blow molding, powder coating, casting, and by other methods well known in the art of manufacturing thin-walled, shaped containers of plastic.

Figure 2:
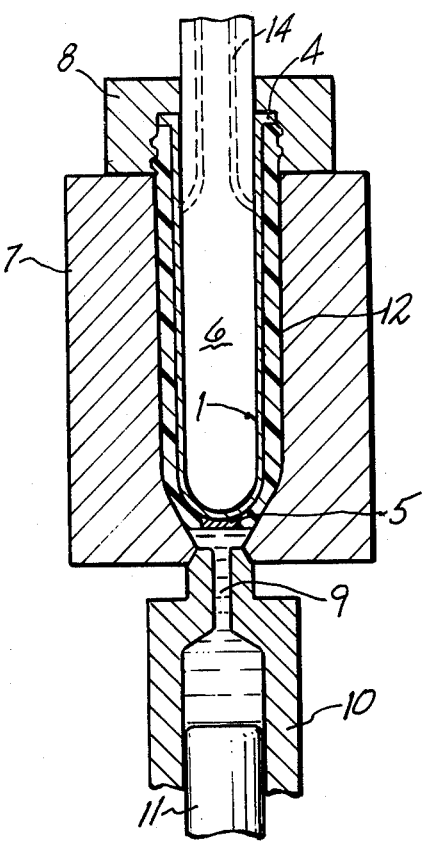
FIG. 2 is a longitudinal section with parts in elevation of a parison mold showing the core covered by the pre-formed liner of FIG. 1.

The liners shown in FIG. 1 are used in a parison mold according to FIG. 2 which consists of a core 6, which may be a blow core, and a parison mold 7 and a tool for forming the open end of the hollow article, the neck ring 8. A passage or gate 9 connects the parison mold 7 with a supply of hot plastic contained within cylinder 10 from which the molten plastic may be pressed into parison mold 7 by piston 11 to effect filling of the space between the core 6 and the parison mold 7 and the space within the neck ring 8 communicating with the parison mold. It should be noted that the heat absorbing or dissipating member 5 is adjacent the gate 9 and acts as a shield to absorb and/or dissipate the heat of the molten plastic and to prevent the molten plastic from damaging the liner.

Figure 3:
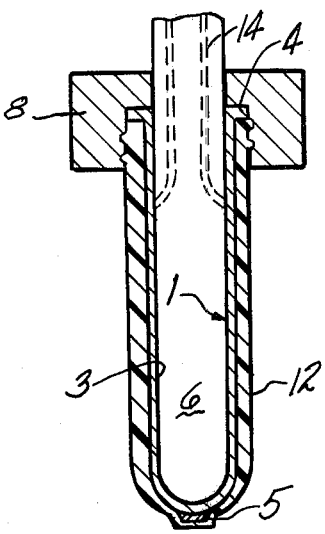
FIG. 3 is a similar view showing the core removed from the parison mold with the parison thereon.

The composite parison 12 molded in the apparatus shown in FIG. 2 may be removed from the parison mold 7 and used as a composite article in the form shown in FIG. 2. Naturally, a variety of configurations may be obtained by varying the shape of the liner and the parison mold. Alternatively, the composite parison 12 shown in FIG. 2 may be removed from the parison mold 7 together with core 6 and neck ring 8, as shown in FIG. 3, and inserted into a blow mold 13 in the manner shown in FIG. 4. Pressure fluid obtained from a source not shown may be admitted through fluid passages 14 to the interior of composite parison 12. The blow mold 13 has a mold cavity 15 corresponding to the shape of the hollow article or container to be made and it may be made of two halves which are separable to facilitate the insertion of the parison and the removal of the finished article.

A variety of alternatives may be readily utilized in the above indicated movements of the core. For example, these movements may be carried out by apparatus shown in U.S. Pat. Nos. 2,298,716; 3,100,913; 3,183,551 and in my U.S. Pat. No. 3,029,468. In any such apparatus, one or more blow cores may be used simultaneously and they may be moved from one operating position to another individually or in groups of several blow cores.

Alternatively, the parison may be stretch-blow molded, as shown for example in my U.S. Pat. No. 3,966,378, if bi-axial orientation is desired.

If a blown article is obtained, the liner must have deformation characteristics that exceed or equal those of the injected layer at the temperature normally maintained for expanding the parison into the blow mold cavity 15. It is noted that the heat absorbing or dissipating member 5 does not interfere with the expansion process since the base of the article adjacent the member 5 does not expand substantially.

The material of this liner must be compatible with the material of the injected layer and not interfere with the function of the final hollow article. The liner need not be made of a single material, but may be a composite in which case the final article will have more than two layers depending on the number of layers in the liner.

After the core is in place in the parison mold 7, the hot plastic enters the parison mold via gate 9 under action of piston 11 operating in pressure cylinder 10. Thereafter the hot plastic surrounds the liner under pressure. Due to the intimate contact established thereby between the hot plastic and the exposed surface of the liner, the liner is rapidly heated until its temperature approaches that of the injected plastic, with no distortion or deformation of the liner taking place due to the presence of the heat absorbing or dissipating member 5. Also, at this elevated temperature adhesion of the two materials may readily occur, although adhesion is not essential due to the close association of the layers. In addition, the material of the sleeve is heated sufficiently to render the sleeve deformable at the same rate as the injected plastic to form a readily deformable composite parison 12.

Figure 4:
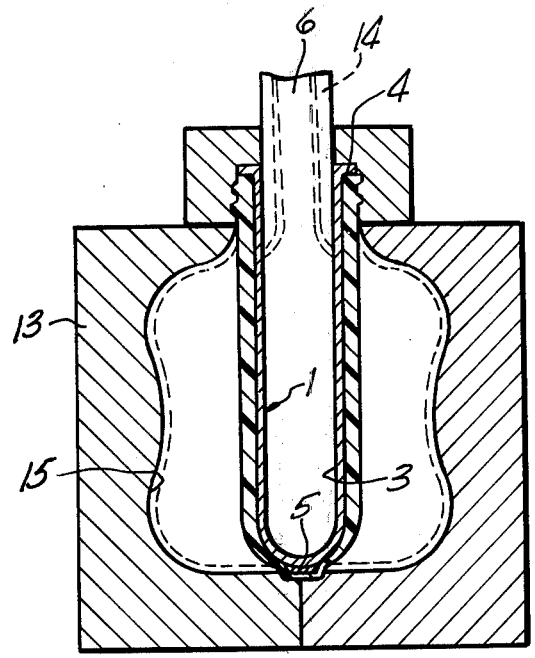
FIG. 4 is a similar view showing the core in blow position in a blow mold.

After forming the composite parison 12, the core 6 is removed from the parison mold together with the neck ring 8 and with the paribon 12 thereon, as shown in FIG. 3. It is next inserted into the blow mold 13 as shown in FIG. 4 if a blown article is desired. Pressure fluid, usually compressed air, is admitted into the parison through fluid passages 14 and the parison is expanded into the blow mold 13, to assume the shape of the blow mold cavity 15, as indicated by dotted lines in FIG. 4, and form an article exhibiting the characteristics of blow orientation. As indicated above, the heat absorbing or dissipating member 5 does not interefere with this expansion process. Fluid pressure is maintained until the blow article cools sufficiently in contact with the walls of the blow mold 13, to be removed therefrom.

Figure 5:
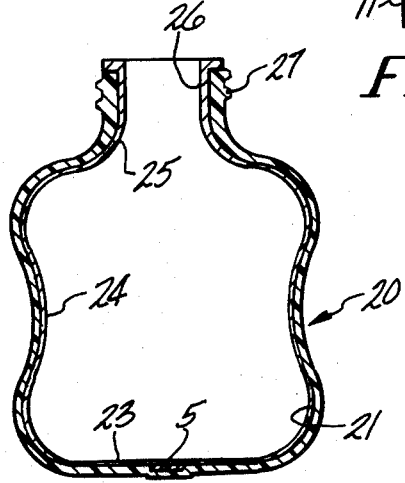
FIG. 5 shows the multilayered hollow plastic article of the present invention removed from the blow mold.
Figure 5A:
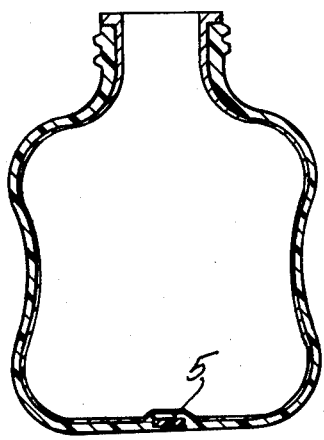
FIG. 5A shows an alternate embodiment of the article of the present invention.

Thus, the hollow multilayered article or container of the present invention is formed as shown in FIG. 5, generally indicated at 20, removed from the blow mold having an inner first layer 21 of thermoplastic material and an outer second layer 22 of pressure molded thermoplastic material, both as described above. It can be clearly seen that the container has a base portion 23, integral side walls 24 and an integral neck or rim portion 25 having a constricted neck opening 26, with the laminated plastic being relatively thicker at the neck portion than at the side walls. The base portion 23 includes the heat absorbing or dissipating, thickened member 5 as discussed above. The outwardly bulged configuration is used in the drawings for illustration purposes only. Naturally, one may obtain an inwardly bulged configuration having a substantially flat base as shown in FIG. 5A by the use of an appropriately configured liner. It can be clearly seen that the diameter of the opening 26 in the neck portion may be substantially smaller than the diameter of the container and also the thickness of the layers of plastic is substantially greater at the neck portion than the thickness of the layers of plastic at the side walls. This provides the desirable strengthening at the neck or rim opening which is often externally threaded, as shown at 27.

A wide flexibility may be used in selecting the inner and outer layers depending upon the particular property desired in each layer. Thus, for example, the inner layer may be selected to provide a wide variety of highly desirable properties, such as solvent resistance and resistance to gas transmission. Examples of liners include PVA and PVA copolymers, acetal polymers, polyallomer copolymers, polycarbonates, PVDC, polyvinylchloride, acrylonitrile and methacrylonitrile polymers, nylon and others. Alternatively, the liner may be a laminated film containing also polyethylene, polypropylene, PVDC, polyvinyl chloride, etc.

Similarly, the outer layer may be selected depending upon the particular properties desired. For example, one may readily utilize polyolefins, such as polyethylene or polypropylene or copolymers thereof, PET, polystyrene, polycarbonates, polyvinyl chloride and others.

As can be readily seen, the container of the present invention provides considerable advantages, such as reasonable cost, ease of formability, impact resistance, capability of being strengthened by orientation, and others, plus the desirable characteristics of the chosen inner film.

Alternatively, the two materials may be made to differ as to their radiation transmission properties, such as, for example, ultraviolet radiation and the corresponding inspection effected by known means to detect the respective radiation intensity.

It is also possible to produce finished articles having desirable appearance by providing different colors and degress of transparency in the sleeve and in the material that is injected around it.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A multilayered, hollow plastic article having a base portion, integral side walls, and an integral open neck or rim portion, said article having an inner first layer of thermoplastic material, and an outer second layer of pressure molded, thermoplastic material, wherein the base portion of the inner first layer is thickened by including a separate and dissimilar member which is a heat absorbing or dissipating member adhered to the base of the inner first layer.

2. An article according to claim 1 wherein said member is selected from the group consisting of aluminum or aluminum base alloys, polycarbonates, polyesters, nylon and teflon.

3. An article according to claim 1 wherein said article is a multilayered, hollow plastic container exhibiting the characteristics of blow orientation.

4. An article according to claim 1 wherein said inner and outer layers are seamless.

5. An article according to claim 1 wherein said inner and outer layers are adhered one to the other substantially over their entire contacting areas.

6. An article according to claim 1 including peripherally extending side walls extending upward from the base portion and terminating at the upper end in said open neck or rim.

* * * * *